United States Patent
Durre et al.

(10) Patent No.: US 7,837,565 B2
(45) Date of Patent: Nov. 23, 2010

(54) ARRANGEMENT FOR CONNECTING TWO SHAFT ENDS WITH A BEARING

(75) Inventors: Markus Durre, Neuenberg (DE); Guido Himmelmann, Mulheim (DE)

(73) Assignee: Carl Freudenberg KG, Weinheim (DE)

( * ) Notice: Subject to any disclaimer, the term of this patent is extended or adjusted under 35 U.S.C. 154(b) by 367 days.

(21) Appl. No.: 11/455,925

(22) Filed: Jun. 19, 2006

(65) Prior Publication Data

US 2007/0009320 A1    Jan. 11, 2007

(30) Foreign Application Priority Data

Jun. 24, 2005    (DE) ........................ 10 2005 029 741

(51) Int. Cl.
F16D 3/78    (2006.01)
(52) U.S. Cl. ................ 464/93; 464/118; 403/133
(58) Field of Classification Search ............ 464/93, 464/118, 94, 95, 137, 138, 89–91, 98, 99; 403/133, 132, 135; 384/158.1, 182, 207
See application file for complete search history.

(56) References Cited

U.S. PATENT DOCUMENTS

| | | | | |
|---|---|---|---|---|
| 1,778,170 A | * | 10/1930 | Smith et al. ........... | 464/93 |
| 1,868,818 A | * | 7/1932 | Eksergian ............ | 464/90 |
| 1,940,884 A | * | 12/1933 | Rosenberg .......... | 464/89 |
| 1,978,939 A | * | 10/1934 | Frederick ............ | 464/137 X |
| 2,368,886 A | * | 2/1945 | Schroeter ............ | 403/135 X |
| 3,393,536 A | * | 7/1968 | Daur ................... | 464/138 |
| 3,843,272 A | * | 10/1974 | Jorn ..................... | 403/132 |
| 4,208,889 A | * | 6/1980 | Peterson ............. | 464/138 |
| 4,257,242 A | * | 3/1981 | Domer et al. | |
| 4,714,450 A | * | 12/1987 | Byrnes et al. ........ | 464/90 |
| 6,068,555 A | * | 5/2000 | Andra et al. ........ | 464/93 |
| 6,800,032 B2 | * | 10/2004 | Heutschi et al. ..... | 464/118 |
| 7,306,393 B2 | * | 12/2007 | Erdogan .............. | 403/133 |

FOREIGN PATENT DOCUMENTS

| | | | |
|---|---|---|---|
| DE | 2113357 | 10/1971 | |
| DE | 2155819 | 12/1972 | |
| DE | 10348787 B3 | 10/2003 | |
| GB | 1276770 | 6/1972 | |
| GB | 1376646 | 12/1974 | |
| JP | 5-60147 A | * 3/1993 | ........... 464/93 |
| WO | WO 03/069172 A1 | * 8/2003 | |

* cited by examiner

*Primary Examiner*—Greg Binda
(74) *Attorney, Agent, or Firm*—Grossman, Tucker, Perreault & Pfleger, PLLC

(57) ABSTRACT

An arrangement, comprising two shaft ends (1, 2), which are mutually connected by a coupling element (3) so as to transmit torque, the coupling element (3) being associated with a bearing (4), which receives at least one shaft end (1), the bearing (4) comprising a support body (5) for the shaft end (1) and an outside body (6) surrounding the support body, and an elastic deformable layer (7) being disposed between the support body (5) and the outside body (6), with the aim of creating an arrangement that guarantees the lowest possible cardan rigidity while achieving maximum radial rigidity, is characterized in that the elastic layer has at least in part a spherical configuration. A bearing also has at least in part a spherically configured layer.

5 Claims, 2 Drawing Sheets

ARRANGEMENT FOR CONNECTING TWO SHAFT ENDS WITH A BEARING

TECHNICAL FIELD

The invention relates to an arrangement, comprising two shaft ends, which are mutually connected by a coupling element so as to transmit torque, the coupling element being associated with a bearing, which receives at least one shaft end, the bearing comprising a support body for the shaft end and an outside body surrounding the support body, and an elastic layer being disposed between the support body and the outside body. The invention furthermore relates to a bearing with a support body for a shaft end and an outside body surrounding the support body, at least one elastic deformable layer being disposed between the support body and outside body.

STATE OF THE ART

Arrangements and bearings of this type are already known from the related art. A category-defining arrangement as well as a category-defining bearing are known from DE 103 48 787 B3 2004.11.18. The bearings act as centering sleeves for the shaft journals associated with the shafts in order to ensure the correct positioning thereof. In order to guarantee flawless operation of such arrangements, exact concentricity between the outside body and support body is required. Furthermore, high radial rigidity is required for precise shaft positioning. If high radial rigidity is not given, it is possible that the shaft may drift. Too high a rigidity in turn causes the formation of sound bridges. The bearing, however, should also have the least possible cardan rigidity in order to be able to handle a tilting motion of the shaft ends.

Furthermore, low torsional and axial rigidity is required since the engines and drive trains of motor vehicles are mounted flexibly, and the shafts consequently may perform a translatory movement in the axial direction. The torsional rigidity causes in particular the decoupling of drive train vibrations. The use of an axial plain bearings moreover facilitates the assembly of the afore-mentioned arrangements.

The production of a thin elastic layer for achieving high radial rigidity and low cardan rigidity is associated with a difficult vulcanization process. During the vulcanization process, parameters such as component tolerances, exact positioning of the parts to be vulcanized in relation to each other as well as injection filling errors require complex optimization measures. Bearings produced this way, and particularly their elastic layers, are subject to high wear, which necessitates the use of expensive materials.

DESCRIPTION OF THE INVENTION

It is therefore the object of the invention to implement an arrangement, which guarantees the least possible cardan rigidity, which achieving maximum radial rigidity at the same time.

According to the invention, the arrangement mentioned above is characterized in that the elastic layer has at least in part a spherical design.

According to the invention, it has been found that the cylindrical layers known from the related art do not satisfy the dynamic behavior of two shaft ends. In a second step it was found that during the operation of the arrangement, the elastic layer is worn too much on the one hand and that the relative motions of the shaft ends to each other is impaired on the other hand. It was then found according to the invention that precisely a spherical layer guarantees high radial rigidity and low cardan rigidity at the same time. This is achieved according to the invention in that the elastic layer due to its arch is subjected primarily to shear stress.

Furthermore it was recognized that an arched elastic layer can achieve high radial rigidity, regardless of how thick the layer is, since during radial excursion primarily push-pull stress occurs. As a result of the reduced cardan rigidity, overall a lower edge pressure occurs between the shaft journal and support body, thus minimizing wear. Due to the arched configuration, the layer moreover is not limited by its thickness to effectively mount shaft journals, so that the application of the layer can be implemented without difficulty.

Consequently, an arrangement is created, which guarantees maximum radial rigidity, which achieving minimal cardan rigidity at the same time.

To this extent, the object mentioned above has been achieved.

The layer could have a uniform thickness along is circumference. This concrete embodiment ensures simple manufacture. Furthermore it is guaranteed that the elastic layer is subject to even wear and that the radial rigidity and cardan rigidity is constant in the circumferential direction of the shaft.

The layer could be made of elastomer, for example rubber. Rubber is a material, which is particularly easy to vulcanize with metals. Under these circumstances, it is also conceivable to connect the rubber to plastic parts by gluing or molding it on. To this extent, the outside body could be made of metal or plastic.

The layer could be pulled over the support body, and then be inserted in the outside body together with the support body as a unit. Thereafter, the outside body could be calibrated, thus creating a unit with positive fit. Against this background, it is also conceivable that the layer is vulcanized or glued on one or both sides either to the support body and/or the outside body. The surface of the outside body or of the support body facing the layer could be configured with gripping structures in order to prevent slipping of the layer. For this, nubs, grooves or knurling would be conceivable.

The support body could be configured spherically; it is essential that the surface of the support body facing the layer has a spherical configuration. This concrete configuration allows a particularly effective connection of the support body to the elastic layer. In this configuration, the outside casing of the support body is configured concentrically to the elastic layer. This concrete embodiment ensures that the support body is wrapped and enclosed by the elastic layer, so that the layer and support body are mutually connected in a form-fit manner, quasi as a ball-and-socket joint.

The support body could be made of plastic. Producing the support body from plastic ensures a cost-effective production of the support body, while giving it a low weight. Furthermore, the use of plastic is advantageous with respect to the production of the bearing since plastics can be extruded or molded easily into cavities. Furthermore, the plastic could have special tribological properties, such as self-lubrication, so that oils or grease could be eliminated.

It is also conceivalbe to use a metallic element as the support body, which element would then be coated with a plastic layer. The support body could be configured as a bronze body, for example, which is provided with a polytetrafluoroethylene coating.

It is also conceivable to produce the support body from metal without coating. Against this background, bronze could be used since this material is suitable for bearings.

The outside body could have a spherical configuration at least in some regions. The crucial aspect is that the surface facing the layer is spherical. Under these circumstances it is conceivable that the outside body 6 be configured as a pipe, which comprises a constriction 8 on the shaft side. The constriction can define a region on one side, which can receive a ball concentrically. The elastic layer 7 and a spherical support body 5 could be fitted into this region. This concrete embodiment represents a simple production of the outside body as well as of the elastic layer. It is also conceivable that a spherical structure be embossed on a pipe by two constrictions. The second constriction 8A would create a firm positive-fit unit of the elastic layer and the support body 5 with the outside body 6. It is conceivable to firmly connect the layer and outside body with each other, and to simply fix the support body in a form-fit manner. The form-fit connection could also exist between the layer and the outside body.

The outside body could be configured as a deep-drawn part. Under these circumstances it is conceivable to configure the outside body as a steel pipe. The deep-drawing technology allows inexpensive manufacture since no grinding and fine machining of the produced pipe body is required. Also production techniques such as hydroforming are possible.

An intermediate body could be provided between the outside body and the support body. It is conceivable to configure the outside body as a pipe, in the cylindrical inside of which a cylindrical intermediate body is fitted on the peripheral side. The intermediate body could have a concave spherical design towards the pipe axis in order to mate with the spherical layer. The support body would then be arranged after the layer. This concrete embodiment allows a unit made of the intermediate body, the layer and support body to be fitted into a pipe made of various materials. It is conceivable that the unit be disposed in the pipe inside in a form-fit or adhesive manner. It is also conceivable to connect arbitrarily many individual parts of the unit with each other in a form-fit manner, and others in turn only in an adhesive manner. This allows individual components of the arrangement to be pre-produced.

The intermediate body could be made of plastic. This would allow to mold the intermediate body into cavities and to manufacture a lightweight arrangement.

The coupling element could be configured as a flexible disk. Typically two fastening flanges are connected to the flexible disk, wherein the bearing could be pressed into one of these flanges as a centering sleeve.

The flexible disk is an elastomer coupling, which is characterized by inexpensive manufacture and particularly good elastic properties.

In addition, the object mentioned above is achieved with a bearing wherein the elastic layer has at least in part a spherical configuration.

In order to avoid repetition, reference is made to the explanations provided for the arrangement with respect to inventive step.

All bearing-specific configurations that have been described within the framework of the embodiments of the arrangement can also be applied to the bearing as an individual element.

Various possibilities are available for advantageously configuring and further developing the teaching of the present invention. For this, reference is made to the claims below on the one hand, and on the other hand to the below explanations of preferred examples of the inventive arrangement as well as of the inventive bearing based on the drawing. Generally preferred embodiments and further developments of the teaching are also explained in conjunction with the explanation of the preferred embodiment of the invention with reference to the drawing.

EXECUTION OF THE INVENTION

Figure 1:
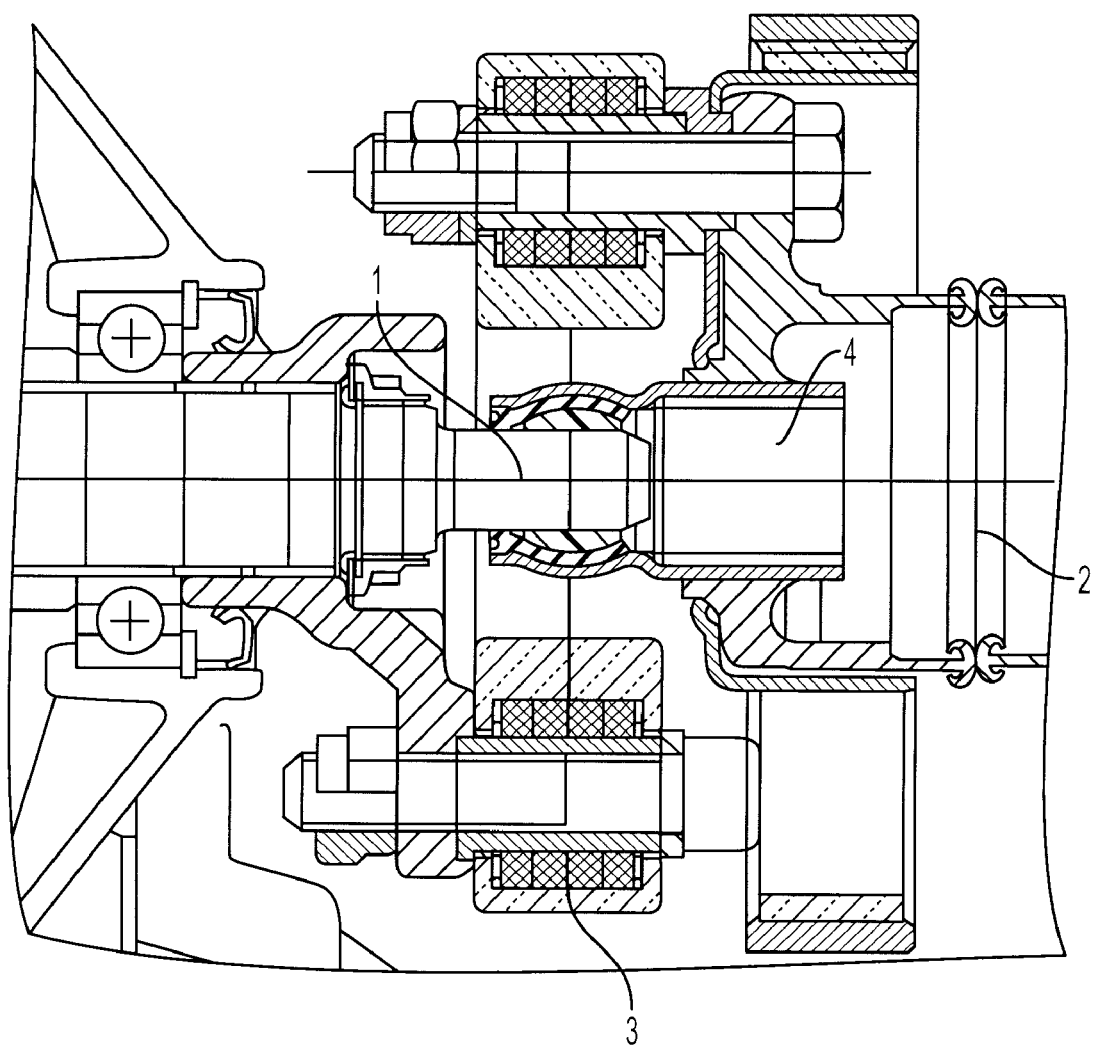
FIG. 1 a schematic view of an arrangement with a flexible disk.

FIG. 1 shows an arrangement with two shaft ends 1, 2, which are mutually connected by a coupling element 3 so as to transmit torque. The coupling element 3 is associated with a bearing 4, which receives at least one shaft end 1. The bearing comprises a support body 5 for the shaft 1 and an outer body 6 surrounding the support body. An elastic deformable layer 7 is disposed between the support body 5 and outside 6. The elastic layer 7 has at least in part a spherical configuration.

The coupling element 3 is configured as a flexible disk. The bearing 4 acts as a centering sleeve for two shaft ends.

Figure 2:
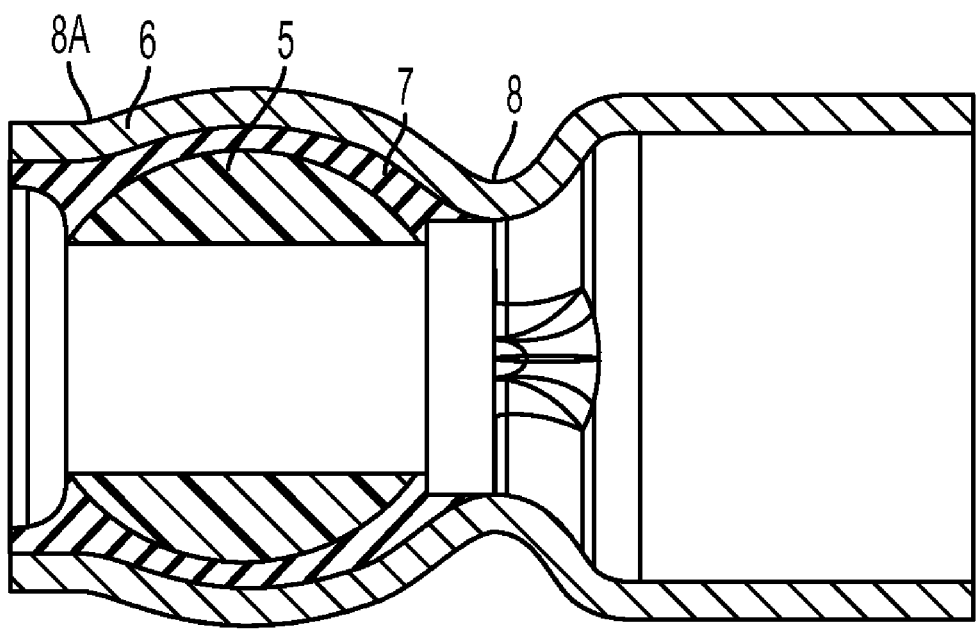
FIG. 2 a bearing with a spherical elastic layer.

FIG. 2 illustrates the bearing 4 disposed in the coupling element 3, which bearing acts as a centering sleeve.

The elastic layer 7 has a spherical configuration. In some areas, it is uniformly thick. The outer surface of the support body 5 facing the layer 7 has a spherical configuration and is surrounded by a partially spherical outside body 6.

The outside body 6 is produced as a deep-drawn part. The outside body 6 is configured as a pipe with a constriction 8. The pipe is embossed with a spherical shape, thus allowing the spherical support body 5 to fit in the pipe.

With respect to further advantageous embodiments and further developments of the teaching according to the invention, reference is made on the one hand to the general part of the description and on the other hand to the attached claims. Finally, it shall be noted in particular that the above arbitrarily selected exemplary embodiments only serve the explanation of the inventive teaching, however they do not limit it to these exemplary embodiments.

What is claimed is:

1. Coupling arrangement, comprising:
   a coupling element configured as a flexible disk,
   two cylindrical shaft ends, which are mutually connected by said coupling element so as to transmit torque, said coupling element being associated with a bearing, which receives at least one of said cylindrical shaft ends,
   the bearing comprising a support body for one of said cylindrical shaft ends; an outside body surrounding the support body wherein said support body has an outer surface; and at least one elastic deformable layer being disposed between said support body and said outside body;
   characterized in that the bearing acts as a centering sleeve wherein said bearing does not transmit torque;
   characterized in that said at least one elastic layer has at least in part a spherical configuration and a relatively uniform thickness and said support body outer surface has a spherical configuration that is wrapped and enclosed by said elastic layer, wherein said support body at least partially surrounds said one of said shaft ends;
   further characterized in that in that said outside body has at least in part a spherical configuration and that said outside body is configured as a pipe having two constrictions to receive said elastic layer and said support body between said constrictions.

2. Coupling arrangement according to claim 1, characterized in that the elastic deformable layer is made of elastomer.

3. Coupling arrangement according claim 1, characterized in that the support body is in part made of plastic.

4. Coupling arrangement according to claim 1 characterized in that the outside body is a deep draw part.

5. A bearing, for use in a coupling arrangement capable of receiving two cylindrical shaft ends, the bearing comprising:
 a support body for one of said cylindrical shaft ends and an outside body surrounding the support body, wherein said support body has an outer surface; and
 at least one elastic deformable layer being disposed between said support body and said outside body;
 characterized in that said at least one elastic layer has at least in part a spherical configuration and a relatively uniform thickness and said support body outer surface has a spherical configuration that is wrapped and enclosed by said elastic layer, wherein said support body at least partially surrounds said one of said shaft ends;
 further characterized in that said outside body has a spherical configuration at least in some regions and that the bearing is a centering sleeve for said two shaft ends;
 wherein said outside body is configured as a pipe with two constrictions to receive said elastic layer and said support body between said constrictions wherein said bearing does not transmit torque.

* * * * *

UNITED STATES PATENT AND TRADEMARK OFFICE
CERTIFICATE OF CORRECTION

| | | |
|---|---|---|
| PATENT NO. | : 7,837,565 B2 | Page 1 of 1 |
| APPLICATION NO. | : 11/455925 | |
| DATED | : November 23, 2010 | |
| INVENTOR(S) | : Markus Duerre et al. | |

It is certified that error appears in the above-identified patent and that said Letters Patent is hereby corrected as shown below:

On the title page, item (75), delete "Markus Durre" and insert -- Markus Duerre --, therefor.

On the title page, item (75), delete Markus Duerre's residency, "Neuenberg" and insert -- Neuenburg --, therefor.

On the title page, in item (75), delete Guido Himmelmann's residency, "Mulheim" and insert -- Muellheim --, therefor.

Signed and Sealed this
Twenty-first Day of June, 2011

David J. Kappos
*Director of the United States Patent and Trademark Office*